United States Patent [19]

Grisamore et al.

[11] Patent Number: 5,296,250

[45] Date of Patent: Mar. 22, 1994

[54] CAKE MIXES UTILIZING UNCHLORINATED WHEAT FLOUR

[75] Inventors: Stephen Grisamore; Glen L. Weaver, both of Omaha, Nebr.

[73] Assignee: ConAgra Flour Milling Co., Omaha, Nebr.

[21] Appl. No.: 808,015

[22] Filed: Dec. 13, 1991

[51] Int. Cl.$^5$ ............................................. A21D 10/00
[52] U.S. Cl. ................................. 426/555; 426/549; 426/552; 426/553; 426/554; 426/622
[58] Field of Search ............... 426/549, 552, 553, 554, 426/555, 622

[56] References Cited

U.S. PATENT DOCUMENTS

| | | | |
|---|---|---|---|
| 3,490,917 | 1/1970 | Doe et al. | 99/93 |
| 3,551,166 | 12/1970 | Baum et al. | 426/555 |
| 3,711,297 | 1/1973 | Strobel et al. | 99/93 |
| 3,974,298 | 8/1976 | Cauvain et al. | 426/553 |
| 4,157,406 | 6/1979 | Hanamoto et al. | 426/622 |
| 4,294,864 | 10/1981 | Kulp et al. | 426/549 |
| 4,748,027 | 5/1988 | Schou et al. | 426/96 |
| 4,961,937 | 10/1990 | Rudel | 426/19 |

FOREIGN PATENT DOCUMENTS

0020170 10/1980 European Pat. Off. .
0305105 1/1989 European Pat. Off. .
0312391 4/1989 European Pat. Off. .

OTHER PUBLICATIONS

Kent, N. L. 1956, "Technology of Cereals", Pergamon Press, N.Y. 3rd Ed.

Quinoa (Chenopodium quinoa) Starch-Physico-chemical Properties and Functional Characteristics, K. Lorenz, 1990.

Steeping of Poor Quality Wheat, Effects on Physicochemical Properties and Functional Characteristics of the Starch, N. AlJawad et al., 1982.

Steeping of Starch at Various Temperatures-Effects on Functional Properties, K. Lorenz et al., 1980.

Average Specific Cake Resistance Determined in the Pressure Of Sedimentation in Filtration of Starch Slurry Under Constant Pressure, Takai et al., 1987.

'Lite' Cakes a matter of formula manipulation, Smith, 1984.

Effects of Modified Starch in Modern Cake Formulas, Belshaw, 1980.

Heat-Moisture Treatment of Starches: II. Functional Properties and Baking Potential, K. Lorenz et al., 1981.

Water-Loss Rates and Temperature Profiles of Cakes of Different Starch Content Baked in a Controlled Environment Oven, Davis et al., 1979.

Performance of Wheat and Other Starches in Reconstituted Flours, Sollars et al., 1971.

Effect of cassava starch on the strength of wheat flours milled in Ghana and their use in biscuits, Andah, 1977.

Primary Examiner—Helen F. Pratt
Attorney, Agent, or Firm—Willian Brinks Hofer Gilson & Lione

[57] ABSTRACT

Cake mixes utilizing unchlorinated wheat flour are disclosed comprising a quantity of unchlorinated wheat flour and about 20–40 bakers wt % unmodified starch. The cake mixes of this invention may further comprise 20–60 bakers wt % shortening, sweetening agents and a protein source. Also disclosed are cakes made from such mixes.

11 Claims, No Drawings

CAKE MIXES UTILIZING UNCHLORINATED WHEAT FLOUR

BACKGROUND OF THE INVENTION

This invention relates to cakes and more particularly cake mixes made from unchlorinated wheat flour.

In the United States, cake flour is normally bleached with chlorine gas. Cakes made from chlorinated flour generally have more desirable volume, texture, grain and eating quality than cakes from unchlorinated wheat flour, Moreover, white cakes made from chlorinated flour have improved color. Despite the foregoing advantages, there is increasing pressure to discontinue the use of chlorinated flour due to health concerns. Many foreign countries prohibit the use of chlorinated flour in food products. A need thus exists for cakes made from unchlorinated flour that have volume and taste attributes similar to cakes made from chlorinated flour.

SUMMARY OF THE INVENTION

In one aspect of this invention, a cake mix is provided comprising a quantity of unchlorinated wheat flour and about 20–40 bakers wt % unmodified starch. Preferably, the cake mix will further comprise about 100–140 bakers wt % sweetening agent and about 15–30 bakers wt % of a protein source.

In another aspect of this invention, a cake mix is provided comprising a quantity of unchlorinated wheat flour; about 20–50 bakers wt % shortening, and about 20–40 bakers wt % unmodified starch. Preferably, the cake mix comprises about 25–35 bakers wt % unmodified starch selected from the group consisting of wheat starch, oat starch, rice starch, corn starch and mixtures thereof. More preferably, the cake mix further comprises about 100–140 bakers wt % sweetening agent, and about 15–30 bakers wt % protein source.

In yet another aspect of this invention, cakes made from the cake mixes of this invention are provided.

As used herein the phrase "bakers wt %" refers to the flour weight basis wherein the quantity of wheat flour is taken as 100% by weight.

DETAILED DESCRIPTION OF THE PRESENTLY PREFERRED EMBODIMENTS

Cake mixes of the present invention utilize unchlorinated wheat flour. The cake mixes of the present invention are based on the discovery that providing about 20–40 bakers wt % unmodified starch to unchlorinated wheat flour provides surprisingly good cake mixes useful in making cakes that have volume and taste characteristics comparable to cakes made from conventional mixes which utilize chlorinated wheat flour. Moreover, cakes made from the mixes of this invention have surprisingly improved shelf-life and freeze/thaw stability.

In one embodiment of the present invention, a cake mix useful for making sponge cake is provided comprising about 20–40 bakers wt % unmodified starch and a quantity of unchlorinated wheat flour. As used herein the term "unchlorinated" refers to the fact that the wheat flour is not subjected to chlorination treatment which is conventionally used in the art to bleach wheat flour. Preferably, the wheat flour is also free of other treatments known in the art, as, for example, heat treatment. Also, it is preferred that the flour is not of the reconstituted variety. Suitable wheat flours include but are not necessarily limited to soft red winter wheat flour, soft white winter wheat flour, hard red spring wheat flour, hard white wheat flour, hard red winter wheat flour and durum wheat flour. Preferably, the flour is selected from the group consisting of soft red winter wheat flour and soft white winter wheat flour.

The cake mixes of this invention comprise about 20–40 bakers wt % unmodified starch. More preferably, the cake mixes of this invention comprise about 25–35 wt %, and most preferably about 28–32 wt %, unmodified starch. By "unmodified starch", reference is made to unmodified or granular starch as extracted from the native source as distinguished from the so-called "modified" or chemically, biologically, or physically treated starches. Additionally, waxy starches do not perform satisfactorily in the present invention. Preferably the starch is selected from the group consisting of unmodified wheat starch, oat starch, rice starch and mixtures thereof. Most preferably, unmodified wheat starch is utilized in the cake mixes of the present invention.

In another embodiment of this invention, a reduced shortening cake mix is provided. The reduced shortening cake mix comprises unchlorinated wheat flour and unmodified starch as described above, as well as an amount of shortening. The cake mixes of this invention generally comprise 20–60 bakers wt % cake shortening. More preferably, the mixes comprise about 20–40 bakers wt %, and even more preferably about 25–35 bakers wt % cake shortening. Most preferably, the cake mix of this invention will comprise shortening reduced by an amount corresponding to the amount of unmodified starch utilized in the cake mix. That is, conventional cake mixes normally contain about 60 bakers wt % shortening. 10 Thus, the cake mixes of this invention most preferably contain an amount of shortening represented by the following formula:

$$S = 60 - X$$

wherein S is bakers wt % shortening and X is the bakers wt % of unmodified starch utilized in the cake mix.

Any and all cake shortenings known by those skilled in the art are contemplated for use in this invention. Suitable shortenings include but are not necessarily limited to solid or plastic, as well as liquid or semi-fluid glyceride shortenings, including both mono- and diglycerides, derived from animal, vegetable or marine fats and oils. Also contemplated for use in this invention are synthetically prepared shortenings. A preferred shortening is Perflex Emulsified Type Shortening available form Durkee Foods Corp., Cleveland, Ohio. Perflex contains partially hydrogenated soybean and cottonseed oils with added propylene glycol, mono- and diesters of fats and fatty acids. Another preferred shortening is B&R Vegetable Cake Shortening available from Brechet & Richter ("B&R"), Minneapolis, Minn. The B&R shortening contains partially hydrogenated soybean and cottonseed oils with added mono- and diglycerides. A most preferred shortening is available from Proctor & Gamble under the name SWEETEX, which is a vegetable shortening containing partially hydrogenated soybean and palm oils with added mono- and diglycerides.

The cake mixes of this invention preferably include a quantity of sweetening agent. Sweetening agents may be present in an amount from about 100–140 bakers wt % of the cake mix. Preferably, the sweetening agent comprises about 110–130 bakers wt % of the cake mix.

All sweetening agents known by those skilled in the art are contemplated for use in the cake mixes of this invention, including both sugar and sugarless sweeteners. Suitable sweetening agents include but are not necessarily limited to any of the commonly used granular sugars such as sucrose, dextrose, maltose, fructose, lactose, and brown and invert sugars. The sugars can also be in powdered form, and mixtures of more than one type of sugar can be used. Preferred sweetening agents are dextrose corn sugar available from A. E. Staley Co., Decatur, Ill.; high fructose corn syrup available from Brechet and Richter, Minneapolis, MN (dextrose equivalent=42), pure honey available from SueBee, Sioux City, Iowa; and raisin concentrate available from Sun Maid, Kingsbury, Calif. The most preferred sweetening agent is fine granulated sugar, which is available from Imperial Sugar Co., Sugarland, Tex. and sold under the name Holly's Bakers' Special.

The cake mixes of this invention may also include a quantity of a protein source. Suitable protein sources include but are not necessarily limited to rye, soy, cottonseed, peanut, pea, egg whites, milk, whey, whey protein concentrate and the like. Preferred protein sources include egg whites, nonfat dry milk, dried egg whites, whey, whey protein concentrate. The protein source is preferably present at a level from about 15-30 bakers wt % of the cake mix. Those skilled in the art will recognize, however, that the amount of protein source may vary, depending on the type of cake desired.

EXAMPLES

The cakes described in the following examples were made according to the presently preferred equipment and ingredients set out in Table 1.

then baked for 26 minutes at 360° F., and thereafter cooled for one hour under ambient conditions.

EXAMPLE 1

Table 2 relates to a comparison of layer cakes made from cake mixes utilizing unchlorinated soft winter wheat flour, cake mixes utilizing unchlorinated hard red spring wheat flour, and conventional mixes utilizing chlorinated soft winter wheat flour.

The cakes made from cake mixes containing unchlorinated soft winter wheat flour, 30 wt % unmodified oat starch, and 30 bakers wt % shortening had similar volume and compared quite favorably to cake (20), which was made from a conventional cake mix utilizing chlorinated soft winter wheat flour and 60 bakers wt % shortening. Also, cakes made from mixes utilizing unchlorinated soft wheat flour had volumes quite similar to cakes made from mixes utilizing unchlorinated hard wheat flour. The cakes made from cake mixes utilizing unchlorinated wheat flour, 40 bakers wt % unmodified oat starch, and 20 bakers wt % shortening had acceptable volumes. However, a cake made from a mix utilizing unchlorinated soft wheat flour, 15 bakers wt % unmodified oat starch and 45 bakers wt % shortening had very poor volume.

It can also be determined from Table 2 that it is preferable to reduce the shortening from conventional levels (i.e. 60 bakers wt %) by an amount corresponding to the amount of unmodified starch utilized in the cake mix. In other words, it is preferred to replace shortening with unmodified starch in the cake mixes of this invention. Conversely, as demonstrated by cakes (17)-(20), reducing the shortening levels in conventional cake mixes significantly reduces the volume of the resulting cakes. As demonstrated by cake (16), merely adding

TABLE 1

| Variable Control (Grams) | 20% Starch | 30% Starch | 40% Starch | Ingredients | Mixing Method |
|---|---|---|---|---|---|
| 200[1](_)[4] | 200[2](160)[3] | 200[2](140)[3] | 200[2](120)[3] | 1. Flour | 1. Dry-Blend Ingredients |
| 240 | 240 | 240 | 240 | Granulated Sugar | 1 Minute at low speed |
| 0 | 40 | 60 | 80 | Starch | |
| 15 | 15 | 15 | 15 | Nonfat Dry Milk | |
| 30 | 30 | 30 | 30 | Dried Egg Whites | |
| 7.5 | 7.5 | 7.5 | 7.5 | Salt | |
| 10 | 10 | 10 | 10 | Baking Powder (Double Acting) | |
| 125 | 145 | 145 | 145 | 2. Water | 2. Add liquids and stir. |
| 2 | 2 | 2 | 2 | Vanilla Flavoring | Add shortening and mix |
| 120(_)[4] | 80(120)[3] | 60(120)[3] | 40(120)[3] | Cake Shortening | 1 minute at low speed |
| 5 | 5 | 5 | 5 | Kake Mate Emulsifier[5] | 3 minutes at medium speed |
| 65 | 65 | 65 | 65 | 3. Water | 3. Add water and scrape bowl. Mix: 1 minute at low speed 2 minutes at medium speed |
| 60 | 60 | 60 | 60 | 4. Water | 4. Add water and scrape bowl. Mix: 2 minutes at low speed |
| 879.5 | 899.5 | 899.5 | 899.5 | Total Weight | Mixer: Hobart N-50 with 5 quart bowl and paddle agitators |

[1]Chlorinated soft winter wheat flour
[2]Unchlorinated soft winter, hard winter, or hard spring wheat flour
[3]When unchlorinated flour is replaced with starch.
[4]In some of the controls herein, a portion of the shortening was replaced with chlorinated flour. In control cakes with 15 bakers wt % shortening, the amount of shortening was (42 g) and the amount of flour was (278 g). In control cakes with 30 bakers wt % shortening, the amount of shortening was (74 g) and the amount of flour was (246 g). In control cakes with 45 bakers wt % shortening, the amount of shortening was (99 g) and the amount of flour was (221 g).
[5]Available from Mallet & Co., Carnegie, PA under the trade name Kake Mate (cake emulsifier special).

Cakes were prepared from the mixes having the formulations in Table 1 by adding 400 grams batter to an eight (8) inch diameter layer cake pan. The mix was unmodified oat starch without reducing the level of shortening in the conventional cake mix results in a cake with less desirable volume.

EXAMPLE 2

Table 3 relates to a comparison of layer cakes made from cake mixes utilizing unchlorinated soft wheat flour, cakes made from mixes utilizing unchlorinated hard wheat flour and cakes made from conventional mixes utilizing chlorinated wheat flour and 60 bakers wt % shortening. As can be concluded from Table 3, cakes made from mixes containing unchlorinated wheat flour, 30 bakers wt % unmodified wheat starch and 30 bakers wt % shortening had volumes similar to a cake made from a conventional mix containing chlorinated soft wheat flour and 60 bakers wt % shortening (cake 14). Cakes made from mixes containing unchlorinated wheat flour, 40 bakers wt % unmodified wheat starch and 20 wt % shortening also compared favorably to cake (14). From Table 3 it appears that unmodified wheat starch having a smaller particle size distribution is preferred. Furthermore, it is preferred to reduce the shortening from conventional levels by an amount corresponding to the amount of unmodified wheat starch utilized in the cake mix.

EXAMPLE 3

Table 4 relates to layer cakes made from mixes utilizing unchlorinated soft wheat flour, cakes made from mixes utilizing unchlorinated hard wheat flour and cakes made from conventional mixes utilizing chlorinated soft wheat flour and 60 bakers wt % shortening. As can be concluded from Table 5, cakes made from mixes containing 30 bakers wt % unmodified rice starch and 30 bakers wt % shortening had volumes similar to a cake made from a conventional mix containing chlorinated soft wheat flour and 60 bakers wt % shortening. According to Table 4, soft wheat flour is preferred to hard wheat flour.

EXAMPLE 4

As demonstrated by Table 5, a cake made from a mix utilizing unchlorinated soft wheat flour, 5 bakers wt % unmodified wheat starch and 55 wt % shortening had unacceptable volume. Similarly, a cake made from a mix utilizing unchlorinated soft wheat flour, 15 bakers wt % unmodified wheat starch and 45 bakers wt % shortening had very poor volume. A cake made from a cake mix of this invention, cake (1), had surprisingly superior volume than the prior art cakes made according to the formulation disclosed in U.S. Pat. No. 4,294,864.

EXAMPLE 5

As demonstrated by Table 6, cakes made from mixes of this invention containing either unmodified oat starch, unmodified wheat starch or unmodified rice starch and a corresponding reduction in shortening had volumes superior to cakes made from a conventional cake mix utilizing chlorinated soft wheat flour and 60 bakers wt % shortening.

EXAMPLE 6

Table 7 relates to a comparison of cakes made from mixes of this invention utilizing unchlorinated soft wheat flour and either unmodified wheat starch, unmodified oat starch or unmodified rice starch with cakes made from a conventional mix utilizing chlorinated soft wheat flour and 60 bakers wt % shortening. As can be concluded from this table, the rice starch cake mix was liked equally well as the conventional white cake mix. However, the oat starch and wheat starch cake mixes were liked significantly more than the conventional cake mix. Clearly, all three cakes made from mixes containing unmodified starch and reduced shortening had a preferred overall flavor, were more tender and more moist than a control white cake made from a conventional mix utilizing chlorinated soft wheat flour and 60 bakers wt % shortening. Based on this data, the mixes containing unmodified starch and unchlorinated wheat flour are acceptable substitutes for cake mixes utilizing chlorinated wheat flour, and in fact, mixes utilizing unmodified oat starch or unmodified wheat starch in combination with unchlorinated wheat flour may even be considered superior to conventional mixes utilizing chlorinated wheat flour.

EXAMPLE 7

Table 8 relates to sponge cakes made according to the method provided in Table 1, except that no shortening was utilized. As can be concluded from Table 8, sponge cakes made from mixes utilizing unchlorinated wheat flour and unmodified starch had volumes that compared quite favorably to sponge cakes made from chlorinated wheat flour. However, the use of hard red spring wheat flour resulted in sponge cakes with reduced volume.

EXAMPLE 8

Table 9 demonstrates that cakes made from the mixes of this invention manifest freeze/thaw character superior to a cake made from a conventional mix utilizing chlorinated soft wheat flour and 60 bakers wt % shortening.

EXAMPLE 9

Table 10 demonstrates that cakes made from the mixes of this invention manifest shelf-life superior to a cake made from a conventional mix utilizing chlorinated soft wheat flour and 60 bakers wt % shortening.

As those skilled in the art will, of course, recognize, a wide range of changes and modifications can be made to the preferred embodiments described above. This invention is believed applicable to the widest variety of cake mixes. It is therefore intended that the foregoing detailed description be regarded as illustrative rather than limiting, and that it be understood that it is the following claims, including all equivalents, which are intended to define the scope of this invention.

TABLE 2

| OAT STARCH: SHORTENING[1] | Height at Center[2] | Height at Side[2] | Shrink[3] | Vol.[4] |
| --- | --- | --- | --- | --- |
| (1) 15:45 | 8 | 9 | 4 | 1072 |
| (2) 30:30 | 16 | 12 | 3 | 1357 |
| (3) 30:30 | 16 | 11 | 4 | 1291 |
| (4) 30:30 | 13 | 12 | 4 | 1247 |
| (5) 30:30 | 16 | 10 | 3.5 | 1290 |
| (6) 30:30 | 18 | 11 | 3 | 1380 |
| (7) 30:30 (K-Mix)[5] | 18 | 11 | 2.5 | 1403 |
| (8) 30:30 | 19 | 12 | 2.5 | 1449 |
| (9) 30:30 (K-Mix)[5] | 16 | 10 | 3 | 1312 |
| (10) 40:20 | 17 | 10.5 | 3 | 1346 |
| (11) 40:20 (K-Mix)[5] | 15 | 10 | 3.5 | 1268 |
| (12) 45:15 | 13 | 10 | 3 | 1244 |
| (12) 30:60 | 12 | 6 | 4 | 1094 |
| (14) 30:60 | 19 | 10 | 3.5 | 1357 |
| (15) 30:60 (K-Mix)[5] | 18 | 9 | 4 | 1291 |
| (16) CTRL: 30:60 | 11 | 7 | 5 | 1057 |
| (17) CTRL: 0:15 | 4 | 6 | 3 | 950 |
| (18) CTRL: 0:30 | 13 | 7 | 3 | 1176 |
| (19) CTRL: 0:45 | 16 | 8 | 3.5 | 1246 |

TABLE 2-continued

| OAT STARCH: SHORTENING[1] | Height at Center[2] | Height at Side[2] | Shrink[3] | Vol.[4] |
|---|---|---|---|---|
| (20) CTRL: 0:60 | 20 | 9 | 3 | 1380 |

[1] Amount of oat starch and shortening expressed in bakers wt %. Cakes (1)–(6), (8), (10) and (12)–(15) utilized unchlorinated soft winter wheat flour. Cake (4) utilized unchlorinated hard red spring wheat flour. Cakes (16)–(20) utilized chlorinated soft winter wheat flour. The oat starch was obtained from Alko Co., Koskenkarva, Finland, under the name "Alko oat starch".
[2] In this table, as well as the tables that follow, the center and side of the cakes are expressed in 1/16 inch units plus one inch. Thus, for example, cake (1) above had a height at its center of 1 and 8/16 inches.
[3] In this table, as well as the tables that follow, the shrink in the cakes are expressed in ¼ inch units.
[4] In this table, as well as the tables that follow, cake volume is expressed in cubic centimeters. The cake measurements were made according to the method disclosed in CEREAL SCIENCE TODAY Vol. 6, No. 1, p. 11 (Jan. 1961).
[5] K-MIX indicates cakes that utilized unchlorinated hard red spring wheat flour.

TABLE 3

| WHEAT STARCH: SHORTENING[1] | Height at Center | Height at Side | Shrink | Vol. |
|---|---|---|---|---|
| (1) 30:60[2] | 17 | 10 | 3.5 | 1313 |
| (2) 30:60[2] | 13 | 9 | 4 | 1181 |
| (3) 30:60[3] | 12 | 7 | 4 | 1116 |
| (4) 30:30[2] | 20 | 12 | 3 | 1448 |
| (5) 30:30[3] | 17 | 12 | 3.5 | 1357 |
| (6) 30:30[2] | 17 | 12 | 3 | 1380 |
| (7) 30:30[2] | 20 | 13 | 3 | 1471 |
| (8) 30:30[2] (K-Mix)[4] | 17 | 11.5 | 4 | 1324 |
| (9) 40:20[2] | 21 | 11 | 3 | 1448 |
| (10) 40:20[2] (K-Mix)[4] | 18 | 12.5 | 5 | 1321 |
| (11) CTRL: 0:15 | 4 | 6 | 3 | 950 |
| (12) CTRL: 0:30 | 13 | 7 | 3 | 1176 |
| (13) CTRL: 0:45 | 16 | 8 | 3.5 | 1246 |
| (14) CTRL: 0:60 | 20 | 9 | 3 | 1380 |

[1] Amount of wheat starch and shortening expressed in bakers wt %. Cakes (1)–(7) and (9) utilized unchlorinated soft winter wheat flour.
[2] Starch obtained from Midwest Grain Products. Inc., Atchison, KS under the name "Midsol-50", which is a combination of "A" large starch particles and "B" small starch particles.
[3] Starch obtained from Midwest Grain Products, Inc., Atchinson, KS under the name "Midsol-75", which is predominantly "A" starch having particle sizes greater than about 19 microns.
[4] K-MIX indicates cakes that utilized unchlorinated hard red spring wheat flour.

TABLE 4

| RICE STARCH: SHORTENING[1,3] | Height at Center | Height at Side | Shrink | Vol. |
|---|---|---|---|---|
| (1) 30:60 | 12 | 8 | 4 | 1138 |
| (2) 30:30 | 16 | 12 | 2.5 | 1380 |
| (3) 30:30 | 15 | 12 | 3 | 1335 |
| (4) 30:30 | 17 | 13 | 2.5 | 1426 |
| (5) 30:30 (K-Mix)[2] | 14 | 11 | 3 | 1290 |
| (6) 40:20 | 13 | 11 | 3 | 1267 |
| (7) 40:20 (K-Mix)[2] | 11 | 9 | 3.5 | 1157 |
| (8) CTRL: 0:15 | 4 | 6 | 3 | 950 |
| (9) CTRL: 0:30 | 13 | 7 | 3 | 1176 |
| (10) CTRL: 0:45 | 16 | 8 | 3.5 | 1246 |
| (11) CTRL: 0:60 | 20 | 9 | 3 | 1380 |

[1] Amount of rice starch and shortening expressed in bakers wt %. Cakes (1)–(4) and (6) utilized unchlorinated soft winter wheat flour.
[2] K-MIX indicates cakes that utilized unchlorinated hard red spring wheat flour.
[3] Rice Starch was obtained from California Natural Products Co., Lathrop, CA, under the name "StarchPlus Regular (Type SPR)".

TABLE 5

| WHEAT STARCH: SHORTENING[1] | Height at Center | Height at Side | Shrink | Vol. |
|---|---|---|---|---|
| (1) 30:30 | 16 | 12 | 3.25 | 1346 |
| (2) 5:55 | 6 | 1 | 5.5 | 810 |
| (3) 15:45 | 6 | 5 | 5 | 809 |
| (4) AIB TABLE 1[2] | | | | |
| (a) 10% starch (whip) | 8 | 5 | 3.5 | 1001 |
| (b) 10% starch (paddle) | 7 | 5 | 4.5 | 946 |
| (c) 5% starch (whip) | 7 | 5 | 3.5 | 979 |
| (d) 5% starch (whip) | 7 | 5 | 4 | 963 |
| (5) AIB TABLE 2[3] | | | | |
| (a) 10% starch (whip) | 14 | 8 | 3.25 | 1212 |
| (b) 5% starch (whip) | 11 | 8 | 4 | 1116 |
| (c) 15% starch (whip) | 13 | 9 | 4 | 1181 |

[1] Examples (1)–(3), amount of wheat starch and shortening expressed in bakers wt %. The wheat starch was obtained from Midwest Grain Products, Inc., Atchinson, KS under the name "MIDSOL-50". The flour utilized was unchlorinated soft wheat flour.
[2] Cakes made according to the formulation in Table 1, U.S. Pat. No. 4,294,864. Cake mix comprised wheat starch in the amounts indicated above and 50 bakers wt % shortening.
[3] Cakes made according to the formulation in Table 2, U.S. Pat. No. 4,294,864. Cake mix comprised wheat starch in the amounts indicated above and 25 bakers wt % shortening.

TABLE 3

| STARCH[1] | Height at Center | Height at Side | Shrink | Vol. |
|---|---|---|---|---|
| OAT STARCH | | | | |
| | 16 | 12 | 3 | 1357 |
| | 16 | 11 | 4 | 1291 |
| | 13 | 12 | 4 | 1297 |
| | 16 | 10 | 3.5 | 1290 |
| | 19 | 12 | 2.5 | 1449 |
| | 18 | 11 | 3 | 1380 |
| (K-Mix)[2] | 18 | 11 | 2.5 | 1403 |
| (K-Mix)[2] | 16 | 10 | 3 | 1312 |
| Average: | 17 | 11 | 3.2 | 1341 |
| WHEAT STARCH | | | | |
| (M-50)[3] | 20 | 12 | 3 | 1448 |
| (M-75)[4] | 17 | 12 | 3.5 | 1357 |
| (M-50)[3] | 17 | 12 | 3 | 1380 |
| (M-50)[3] | 20 | 13 | 3 | 1471 |
| (M-50)[3] | 16 | 12 | 3.25 | 1346 |
| (M-50) (K-Mix)[2] | 17 | 11.5 | 4 | 1324 |
| Average: | 18 | 12 | 3.3 | 1388 |
| RICE STARCH | | | | |
| | 16 | 12 | 2.5 | 1380 |
| | 15 | 12 | 3 | 1335 |
| | 17 | 13 | 2.5 | 1426 |
| (K-Mix)[2] | 14 | 11 | 3 | 1290 |
| Average: | 16 | 12 | 2.8 | 1358 |
| CONTROL | 20 | 9 | 3 | 1380 |
| | 18 | 8 | 4 | 1269 |
| | 16 | 7 | 4 | 1203 |
| | 17 | 8 | 4 | 1247 |
| | 21 | 10 | 4 | 1378 |
| Average: | 18.4 | 8.4 | 3.8 | 1295 |

[1] Cakes made from mixes utilizing 30 bakers wt % starch and 30 bakers wt % shortening.
[2] K-MIX indicates cakes that utilized unchlorinated hard red spring wheat flour.
[3] Midsol-50 starch.
[4] Midsol-75 starch.

TABLE 7

| Attribute | Cake Mix[c] | Mean Score[a,b] |
|---|---|---|
| Acceptance | Wheat Starch | 6.0 |
| | Oat Starch | 5.6 |
| | Rice Starch | 5.5 |
| | Control | 5.0 |
| Appearance | Wheat Starch | 6.4 |
| | Oat Starch | 6.3 |
| | Rice Starch | 6.2 |
| | Control | 6.1 |
| Flavor | Oat Starch | 6.1 |
| | Wheat Starch | 6.1 |
| | Rice Starch | 5.8 |
| | Control | 5.2 |
| Crust Color | Control | 4.2 |

TABLE 7-continued

| Attribute | Cake Mix[c] | Mean Score[a,b] |
|---|---|---|
| | Rice Starch | 4.2 |
| | Oat Starch | 4.2 |
| | Wheat Starch | 4.1 |
| Sweetness | Wheat Starch | 3.8 |
| | Oat Starch | 3.6 |
| | Rice Starch | 3.6 |
| | Control | 3.5 |
| Tenderness | Oat Starch | 3.3 |
| | Wheat Starch | 3.3 |
| | Rice Starch | 3.3 |
| | Control | 3.0 |
| Moistness | Wheat Starch | 3.1 |
| | Oat Starch | 3.1 |
| | Rice Starch | 2.9 |
| | Control | 2.6 |
| Texture | Oat Starch | 3.4 |
| | Rice Starch | 3.3 |
| | Wheat Starch | 3.3 |
| | Control | 3.3 |
| Crumbliness | Rice Starch | 3.8 |
| | Control | 3.8 |
| | Oat Starch | 3.7 |
| | Wheat Starch | 3.6 |

[a]Means based on n = 64. Acceptance, appearance, and flavor means are based on a nine-point hedonic scale: 1 = dislike extremely, 5 = neither like nor dislike, 9 = like extremely. Means for the remaining attributes are based on seven-point "just about right" scales: crust color: 1 = much too light, 7 = much too dark; sweetness: 1 = not nearly sweet enough, 7 = much too sweet; tenderness: 1 = much too tough, 7 = much too tender; moistness: 1 = much too dry, 7 = much too moist; texture: 1 = much too heavy and dense, 7 = much too light and airy; crumbliness: 1 = much too spongy, 7 = much too crumbly.
[b]Means within brackets are not significantly different (p = .05)
[c]The control cakes utilized chlorinated soft wheat flour and 60 bakers wt % shortening. The cakes of the invention utilized unchlorinated soft wheat flour and 30 bakers wt % shortening. The oat starch was obtained from Alko Co., Koskenkarva, Finland, under the name "Alko Starch". The wheat starch was obtained from Midwest Grain Products, Inc., Atchinson, KS under the name "Midsol-50". The rice starch was obtained from California Natural Products Co., Lathrop, CA under the name "StarchPlus Regular (Type SPR)".

TABLE 8

(Sponge Cakes)

| | Center | Side | Shrink | Vol. |
|---|---|---|---|---|
| (1) Control[1] | 20 | 14 | 3.5 | 1468 |
| (2) Oat Starch[2] | 20 | 13 | 4 | 1422 |
| (3) Rice Starch[3] | 17 | 12 | 4 | 1334 |
| (4) Wheat Starch[4] | 21 | 14.5 | 3 | 1527 |
| (5) Oat Starch[5] | 16 | 12 | 4 | 1313 |
| (6) Rice Starch[6] | 12 | 10 | 3 | 1222 |
| (7) Wheat Starch[7] | 19 | 14 | 2.5 | 1495 |

[1]Utilized chlorinated soft winter wheat flour.
[2]Utilized 30 bakers wt % starch; unchlorinated soft winter wheat flour.
[3]Utilized 30 bakers wt % starch; unchlorinated soft winter wheat flour.
[4]Utilized 30 bakers wt % starch; unchlorinated soft winter wheat flour.
[5]Utilized 30 bakers wt % starch; unchlorinated hard red spring wheat flour.
[6]Utilized 30 bakers wt % starch; unchlorinated hard red spring wheat flour.
[7]Utilized 30 bakers wt % starch; unchlorinated hard red spring wheat flour.

TABLE 9

(Freeze/Thaw)

| Days in Freezer | Chlorinated Soft Wheat[1] | Unchlorinated Soft Wheat[1,2] | Unchlorinated Hard Wheat[1,2] |
|---|---|---|---|
| 1 | 643 | 393 | 308 |
| 2 | 627 | 330 | 278 |
| 3 | 570 | 493 | 295 |
| 7 | 783 | 351 | 337 |

[1]Grams of force applied to depress the cake surface 6 mm @ 2 mm/second. Average of six readings using a TAXT 2 Texture Analyzer (available from Texture Technologies, Inc., Scarsdale, NY).
[2]Cakes made from mixes utilizing 30 bakers wt % wheat starch (Midsol-50) and 30 bakers wt % shortening.

TABLE 10

(Shelf-Life)

| Days on Shelf | Chlorinated Soft Wheat[1] | Unchlorinated Soft Wheat[1,2] | Unchlorinated Hard Wheat[1,2] |
|---|---|---|---|
| 0 | 458 | 327 | 231 |
| 1 | 695 | 312 | 299 |
| 2 | 694 | 473 | 422 |
| 3 | 821 | 498 | 445 |
| 7 | 863 | 670 | 508 |

[1]Grams of force applied to depress the cake surface 6 mm @ 2 mm/second. Average of six readings using a TAXT 2 Texture Analyzer (available from Texture Technologies, Inc., Scarsdale, NY).
[2]Cakes made from mixes utilizing 30 bakers wt % wheat starch (Midsol-50) and 30 bakers wt % shortening.

We claim:

1. A cake mix comprising:
a quantity of unchlorinated flour;
about 20–40 bakers wt % unmodified starch, and
an amount of shortening based on the amount of unmodified starch in the cake mix and represented by the formula $$S = 60 - X$$

wherein S represents the amount of shortening in bakers wt % and X represents the bakers wt % of unmodified starch in the cake mix.

2. The cake mix of claim 1 wherein the starch is selected from the group consisting of wheat starch, oat starch, rice starch and mixtures thereof.

3. The cake mix of claim 2 comprising about 25–35 bakers wt % starch.

4. The cake mix of claim 1 wherein the starch comprises wheat starch.

5. A cake made from the cake mix of claim 1.

6. A cake mix comprising:
a quantity of unchlorinated wheat flour;
about 25–35 bakers wt % unmodified starch wherein said starch is selected from the group consisting of wheat starch, oat starch, rice starch and mixtures thereof; and
about 25–35 bakers wt % shortening.

7. A cake made from the cake mix of claim 6.

8. The cake mix of claim 6 wherein the starch comprises wheat starch.

9. A cake mix comprising:
a quantity of unchlorinated wheat flour;
about 25–35 bakes wt % unmodified wheat starch;
about 25–35 bakers wt % shortening;
about 100–140 bakers wt % sweetening gent; and
about 15–30 bakes wt % protein source.

10. A cake made from the cake mix of claim 9.

11. A cake mix comprising:
a quantity of unchlorinated flour;
about 25–35% bakers wt % unmodified starch, wherein the starch is selected from the group consisting of wheat starch, oat starch, rice starch and mixtures thereof;
and an amount of shortening based on the amount of unmodified starch in the cake mix and represented by the formula:

$$S = 60 - X$$

wherein S represents the amount of shortening in bakers wt % and X represents the bakers wt % of unmodified starch in the cake mix.

* * * * *

UNITED STATES PATENT AND TRADEMARK OFFICE
CERTIFICATE OF CORRECTION

PATENT NO. : 5,296,250
DATED : March 22, 1994
INVENTOR(S) : Stephen Grisamore

Page 1 of 2

It is certified that error appears in the above-indentified patent and that said Letters Patent is hereby corrected as shown below:

ON THE TITLE PAGE

In column 2, line 5 of "OTHER PUBLICATIONS", please delete "AlJawad" and substitute --Al Jawad--.

In column 2, lines 8-9 of "OTHER PUBLICATIONS", please delete "Pres-sure" and substitute --Presence--.

In column 1, line 11, after "cakes" insert --made--.

In column 1, line 12, after "flour" delete "," and substitute --.--.

In column 2, line 33, delete "10".

In column 2, line 50, delete "form" and substitute --from--.

In line 15 of Table 2 in column 6, delete "(12)" and substitute --(13)--.

In column 8, line 22, delete "TABLE 3" and substitute --TABLE 6--.

UNITED STATES PATENT AND TRADEMARK OFFICE
CERTIFICATE OF CORRECTION

PATENT NO. : 5,296,250
DATED : March 22, 1994
INVENTOR(S) : Stephen Grisamore

It is certified that error appears in the above-indentified patent and that said Letters Patent is hereby corrected as shown below:

COLUMN 10:

In claim 1, line 6, after "formula" insert --:--.

In claim 9, line 3, delete "bakes" and substitute --bakers--.

In claim 9, line 6, delete "bakes" and substitute --bakers--.

In claim 11, line 3, after "35" delete "%".

Signed and Sealed this

Seventeenth Day of January, 1995

*Attest:*

BRUCE LEHMAN

*Attesting Officer*     *Commissioner of Patents and Trademarks*